US010988641B2

United States Patent
Lam et al.

(10) Patent No.: US 10,988,641 B2
(45) Date of Patent: Apr. 27, 2021

(54) SURFACE REPAIR PATCH AND METHOD OF USING SAME

(71) Applicant: Surface Medical Inc., Alberta (CA)

(72) Inventors: Iwain Lam, Alberta (CA); Don Pierson, Dresher, PA (US)

(73) Assignee: Surface Medical Inc., Alberta (CA)

( * ) Notice: Subject to any disclaimer, the term of this patent is extended or adjusted under 35 U.S.C. 154(b) by 640 days.

(21) Appl. No.: 14/868,297

(22) Filed: Sep. 28, 2015

(65) Prior Publication Data

US 2016/0017183 A1 Jan. 21, 2016

Related U.S. Application Data

(63) Continuation of application No. PCT/CA2014/050365, filed on Apr. 9, 2014.

(60) Provisional application No. 61/810,085, filed on Apr. 9, 2013.

(51) Int. Cl.
| | |
|---|---|
| *C09J 5/00* | (2006.01) |
| *B29C 73/10* | (2006.01) |
| *C09J 7/38* | (2018.01) |
| *C09J 7/25* | (2018.01) |
| *C09J 7/24* | (2018.01) |

(52) U.S. Cl.
CPC ............. *C09J 5/00* (2013.01); *B29C 73/10* (2013.01); *C09J 7/245* (2018.01); *C09J 7/25* (2018.01); *C09J 7/38* (2018.01); *C09J 2475/006* (2013.01); *Y10T 428/14* (2015.01)

(58) Field of Classification Search
CPC ... C09J 7/0282; C09J 7/245; C09J 7/25; C09J 5/00; C09J 7/38; C09J 2475/006; B29C 73/10; Y10T 428/14; Y10T 428/28
See application file for complete search history.

(56) References Cited

U.S. PATENT DOCUMENTS

| | | | | |
|---|---|---|---|---|
| 2,833,327 A | * | 5/1958 | Boyce | B29C 73/10 |
| | | | | 152/367 |
| 5,399,403 A | * | 3/1995 | Instance | B31D 1/021 |
| | | | | 156/253 |
| 5,406,945 A | * | 4/1995 | Riazzi | A61B 5/0408 |
| | | | | 600/394 |

(Continued)

FOREIGN PATENT DOCUMENTS

| | | |
|---|---|---|
| DE | 4300922 A1 | 7/1994 |
| FR | 2626446 A1 | 8/1989 |

(Continued)

OTHER PUBLICATIONS

Supplementary European Search Report for European Application No. EP14782965.9, dated Jan. 18, 2017, 7 pages.

*Primary Examiner* — Patricia L. Nordmeyer (74) *Attorney, Agent, or Firm* — Perkins Coie LLP; Viola Kung (57) ABSTRACT

The present disclosure provides for a repair device useful in the repair of surfaces, particularly in a healthcare environment. An exemplary form of the present comprises a repair patch, a pre-mask and release liner; the repair patch interposed between the pre-mask and release liner; the removable adhesive interposed between the pre-mask and repair patch; and the permanent adhesive interposed between the repair patch and the release liner; wherein the adhesion value of the removable adhesive is lower than that of the permanent adhesive.

17 Claims, 3 Drawing Sheets

(56) References Cited

U.S. PATENT DOCUMENTS

| | | | |
|---|---|---|---|
| 5,643,648 A | 7/1997 | Kobe et al. | |
| 5,727,819 A * | 3/1998 | Grosskopf | G09F 3/0289 |
| | | | 283/81 |
| 8,399,083 B2 * | 3/2013 | Cowan | G09F 3/0289 |
| | | | 283/100 |
| 2010/0101449 A1 * | 4/2010 | Cornish | A01N 43/36 |
| | | | 106/18.32 |
| 2012/0175864 A1 * | 7/2012 | Kennedy | B32B 37/12 |
| | | | 281/38 |
| 2014/0050876 A1 * | 2/2014 | Collins | B29C 73/10 |
| | | | 428/63 |

FOREIGN PATENT DOCUMENTS

| | | |
|---|---|---|
| WO | 2007/130788 A2 | 11/2007 |
| WO | 2010/001113 A1 | 1/2010 |

* cited by examiner

SURFACE REPAIR PATCH AND METHOD OF USING SAME

This application is a continuation of Application No. PCT/CA2014/050365, filed Apr. 9, 2014; which claims the priority of U.S. Provisional Application No. 61/810,085, filed Apr. 9, 2013. The contents of the above identified applications are incorporated herein by reference in their entireties.

FIELD

The present disclosure pertains to the field of medical surface repair such as, for example, within a healthcare environment. In particular, the present disclosure provides a repair device and method.

BACKGROUND

Healthcare device undergoes significant use and wear throughout its lifespan. Damage to the surface of the healthcare device, such as, tears, punctures, rips, burns, wear, cracks, and other surface damage, presents a potential health risks to patients and healthcare providers. Increasingly, healthcare providers are becoming aware of the role that contaminated environmental surfaces play in the transmission of infections. Patient care initiatives, particularly infection control efforts, are becoming more prevalent. At least 30% of healthcare associated infections can be prevented by following infection prevention and control strategies (Haley, R W et al. *Am J Epidemiol* (1985) Vol. 121:159-67). One challenge in cleaning or disinfecting the surfaces of healthcare devices is the occurrence of damage to the surface of the device as damaged surfaces cannot be easily cleaned or disinfected thereby creating a potential reservoir for infectious agents.

Healthcare devices used in hospital environments have been found to be a source of healthcare acquired infections. Environmental microbiological surveys have indicated that hospital devices (for example, beds, tables, stools, wheelchairs, racks, trolleys, stretchers, mattresses, catheter-bag, and other furniture, equipment and articles used in a hospital environment) can be contaminated with pathogens at a higher incidence relative to other surfaces (see, for example, Rampling, A et al. *J Hosp Infect*. (2001) Vol. 49:109-116; and Blythe, D et al. *J Hosp Infect* (1998) Vol. 38:67-70). In addition, there have been reports of hospital mattresses contaminated with infectious agents, including for example, *Pseudomonas aeruginosa*, methicillin-resistant *Staphylococcus aureus* (MRSA), vancomycin-resistant *Enterococci* (VRE), *Acinetobacter*, and other fungal and viral pathogens. Hospital mattresses may be damaged by a variety of means, such as, for example, extensive use, tears and sharp objects, such as needles. Several studies have demonstrated that damaged mattresses have had a role in outbreaks, the transmission of disease to patients, and in some cases patient death (see Creamer E, et al. *J Hosp Infect* (2008) Vol. 69:8-23; Sherertz, R J et al. *J Infect Dis* (1985) Vol. 151:252-258; Moore E P, et al. *J Hosp Infect* (1991) Vol. 19:5-16; Ndawula, E M et al. *Lancet* (1991) Vol. 337:488; Fujita, K et al. *Br Med J* (1981) Vol. 283:219-220; Robertson, M H et al. *Br Med J* (1981) Vol. 280:831-832; and O'Donoghue, M A et al. *J Hosp Infect* (1992) Vol. 22:73-79). These studies indicate that damaged hospital mattresses may harbour infectious agents and result in hospital acquired infections; whereas intact mattresses or healthcare devices are preferred for appropriate cleaning, disinfection and infection prevention and control.

Infection Prevention and Control (IPC) is an important aspect of proper application and management of healthcare, and one aspect of IPC is maintaining an intact, contiguous, surface on furniture and devices within the healthcare environment so as to enable proper cleaning and maintenance. As a result, many healthcare providers have instituted policies requiring the replacement of healthcare devices having damaged surfaces or the replacement of the damaged components of the device. However, replacement of a healthcare device or its damaged components can be costly, may result in device downtime, and the likelihood of a tear or other surface damage occurring after replacement is high. Thus many damaged healthcare devices are left in use.

Solutions exist to repair damaged surfaces of a variety of non-medical devices. In one solution, ready-mix glue is applied to the damaged portion of the surface. However, this solution tends to be messy, leaves the surface temporarily out of service, and may create toxic fumes or be toxic through direct contact. In another solution, duct, surgical or other types of tape are applied to the damaged portion of the surface. However, the edges of the tape tend to breakdown after extended use or following the application of liquids or body fluids. These edges can be difficult to clean properly, thereby, creating an additional potential reservoir for infectious agents. PCT Patent Application by Collins, T. et al., WO2012/119227 describes an adhesive patch for repairing damaged surfaces of health care devices.

SUMMARY

The present disclosure provides a repair device for health care devices, the repair device comprising:
pre-mask,
repair patch, and
release liner;
wherein the repair patch is interposed between the pre-mask and release liner; removable adhesive interposed between the pre-mask and repair patch; and permanent adhesive interposed between the repair patch and the release liner; wherein the adhesion value of the removable adhesive with respect to the repair patch is lower than the adhesion value of the permanent adhesive with respect to the repair surface.

As used herein, the term "repair patch" refers to a device of a size and shape to cover damage to a health care device. For example, the present repair patches may comprise a film.

As used herein, the term "pre-mask" refers to a device of a size and shape to be used to position the repair patch during a repair and then removed. For example, the present pre-mask may be a film substrate coated with removable adhesive.

As used herein, the term "release liner" refers to a device of a size and shape to shield the present permanent adhesive before use of the present repair device. For example, the release liner may be a sheet of Kraft paper or the like that can be removed to expose the permanent adhesive prior to application of the repair patch.

As used herein, the term "adhesion value" refers to the bond strength the adhesive provides between one material and another. Adhesion values may, for example, be measured by ASTM D3330.

As used herein, the term "permanent adhesive" refers to an adhesive capable of forming a durable bond between the device to be repaired and the repair patch. Such adhesives will generally provide an adhesion value of 200 g/cm or greater to the surface to be repaired. For example, the permanent adhesive may provide an adhesion value of about 300 g/cm or greater, about 400 g/cm or greater, about 500 g/cm or greater, about 600 g/cm or greater, about 700 g/cm or greater, about 800 g/cm or greater, about 900 g/cm or greater, about 1000 g/cm or greater.

As used herein, the term "removable adhesive" refers to an adhesive capable of forming a nondurable bond between the pre-mask and the repair patch. Such adhesives will generally provide an adhesion value of 200 g/cm or less to the repair patch. For example, the removable adhesive may provide an adhesion value of about 180 g/cm or less, about 160 g/cm or less, about 140 g/cm or less, about 120 g/cm or less, about 100 g/cm or less, about 80 g/cm or less, about 60 g/cm or less, about 40 g/cm or less.

DETAILED DESCRIPTION

Furniture, particularly in the healthcare environment, may incur surface damage during its lifespan. Such damage may include tears which results in a non-intact surface. Non-intact surfaces are problematic to clean and disinfect properly. This can create a reservoir for infectious agents/diseases and result in hospital acquired infections. As used herein "furniture" includes without limitation, articles, units, furniture, equipment, beds, accessories, tables, stools, wheelchairs, racks, trolleys, stretchers, and mattresses. As used herein "tear" includes punctures, rips, and any disruption in the contiguous surface which results in the surface no longer being fully intact.

Within the healthcare environment, a repair patch for use in the repair of tears in furniture, or otherwise disrupted surface, will preferably not promote the accumulation or growth of pathogens, it will preferably adhere strongly to the surface being repaired, and will preferably not wrinkle once applied. Further, its application will preferably not significantly interfere with the operation or use of the healthcare device to which it is applied. Certain embodiments of the present repair device will preferably have one or more of the following characteristics:

i. the repair patch, once applied, is preferably 0.254 mm or less in thickness. This will help prevent the accumulation and growth of pathogens along the edge of the repair patch;
  ii. the repair patch preferably adheres fully to the intended surface: any bubbles, wrinkles or flagging can compromise its ability to re-establish the intactness of the surface;
  iii. the top surface of the repair patch that is exposed to the environment is preferably non-toxic and is not adhesive. The top surface is also preferably cleanable with existing hospital cleaning solutions such as, but not limited to, Hydrogen Peroxide, Isopropanol, Quaternary Ammonium compounds, and Sodium Hypochlorite;
  iv. the user is preferably able to apply the repair patch without touching the permanent adhesive layer of the repair patch, as oil residue or other contaminants from the user might affect the repair patch's ability to fully adhere to the intended surface; and
  v. as the intended use of the repair patch is in a healthcare environment, the user will preferably be able to apply the repair patch while wearing medical gloves.

Repair can be difficult for a user to handle, manipulate and/or apply to a surface. For example, the product may fold back on itself leaving wrinkles or bubbles after application. The addition of an interlayer between the repair patch and the adhesive can assist in the handling and application of the repair patch. However, the interlayer increases the overall thickness which can be disadvantageous leading to discomfort for patients, an edge for dirt buildup and microbial growth, or a point of contact and abrasion during cleaning or wiping.

Figure 1:
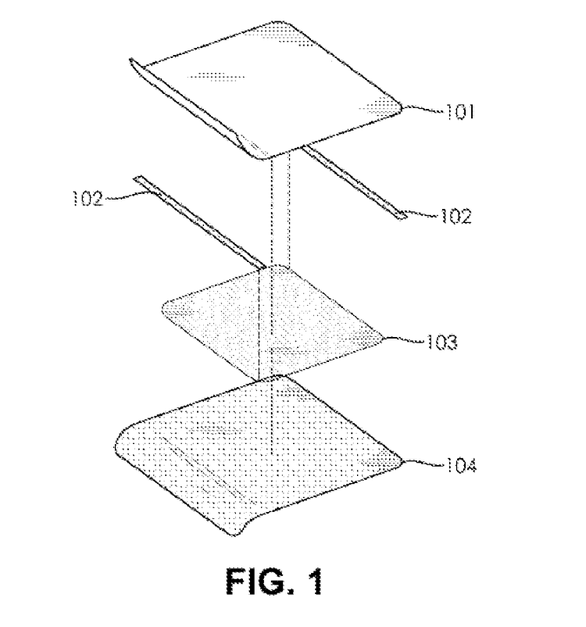
FIG. 1 shows an exploded diagrammatic representation of an embodiment of the present repair device.

The present disclosure provides a repair patch for furniture, particularly in the healthcare environment. FIG. 1 shows one conformation of the present repair device, which comprises a pre-mask, a repair patch and at least one release liner; the repair patch comprises a repair film and permanent adhesive. The upper element of the repair device comprises a polymeric film with a removable adhesive (not shown) to create a carrier layer ("pre-mask") 101 that can act as a supporting layer for the repair patch to aid with product handling and application of the repair patch. The removable adhesive may be selected so as to enable the pre-mask layer to be removed after product application without leaving behind significant residue on repair patch 103, and/or causing the repair patch to lift from the target surface. The repair patch 103 is smaller in area than the upper pre-mask 101. The overhanging area of the pre-mask forms are covered with release liner 102 present on opposing ends of the pre-mask 101. Repair patch 103 has a permanent adhesive present on the side opposing pre-mask 101, such adhesive having the characteristics further disclosed herein. The repair device further comprises a release liner 104 which can be of identical size to pre-mask.

The present repair device comprises a repair patch, which may comprise of a film onto which permanent adhesive is applied, wherein the repair patch is interposed between a pre-mask and release liner; with permanent adhesive interposed between the repair film and the release liner. The permanent adhesive exhibits a preferential bonding to the repair patch as compared to the release liner, as further described herein. The pre-mask may comprise a polymeric film and a removable adhesive, with the removable adhesive interposed between said polymeric film and repair film of the repair device. The removable adhesive exhibits preferential bonding to the pre-mask polymeric film as compared to the repair film. The pre-mask creates a support layer for aiding in the handling and application of the repair patch. For example, the pre-mask can be removed from the repair patch following the removal of the release liner and the application of the repair patch to a target surface such as a medical device or furniture.

The pre-mask preferably comprises a removable adhesive with an adhesion value to the repair patch that is no less than about 28 g/cm, such as no less than about 40 g/cm. The adhesion value to the repair patch is preferably no higher than about 200 g/cm. It is preferred that such values are maintained for at least 2 years as measured under accelerated aging conditions, as generally known in the art. The adhesion value between the pre-mask and the repair patch is preferably greater than the adhesion between the permanent adhesive and the release liner, otherwise the pre-mask may lift from the repair patch during removal of the release liner by the user without the user intending to do so. The adhesion value between the pre-mask and the repair patch is preferably lower than the adhesion level between the permanent adhesive and the target surface, otherwise it could cause inadvertent lifting of the repair patch from the surface after the repair patch is applied to a surface, when the pre-mask is removed by the user. This is of particular importance for the application of the repair patch in a healthcare environment as there is a low tolerance for peeling or lifting which could lead to a non-intact surface.

The present removable adhesive may be any suitable adhesive. Examples of adhesives include, pressure-sensitive adhesives (PSA), microsphere-based adhesives, or the like. The adhesive may be non-cytotoxic, hypoallergenic, resistant to bacterial growth, or a combination thereof. The adhesive may be in the form of an adhesive layer. A pressure-sensitive adhesive may comprise polyurethane, silicone polymer, acrylic, or other synthetic polymer based adhesive, and may or may not be cross-linked. Adhesives are available commercially from, for example, Adchem Inc. (New York, USA), 3M Canada Inc. (Ontario, Canada). Flexcon Inc. (Massachusetts, USA), Medical Adhesive Tape Technologies Inc. (New York, USA), UPM Raflatac (North Carolina, USA), Novacel (Massachusetts, USA), American Biltrite (New Jersey, USA). Microsphere ultra-removable adhesives include Technicote (Microsphere ultra-removable TR-1); Raflatac (Ultra-removable microsphere adhesives RR 522 U, RR 523 U, and RR 524 U, XR-13); Franklin Adhesives and Polymers (Micronax™ 240 and Micronax 250); Green Bay Packaging (Microsphere removable adhesive 272, 275 and 278); 3 Sigma Corporation (Microsphere removable adhesive REP-16); AERO Chemical (Ultra-removable microsphere suspension adhesive ARU01, ARU02, and ARU03); Herma GmbH (acrylic microsphere ultra-removable adhesive 42Upp); Advanced Polymers International (Gel-Tac™ 172G, 101A, 219D).

Table 1 shows various adhesion values observed for removable PSA (SMI_PM2-Removable Pressure Sensitive adhesive with Polyester Film or SMI_PM3-Removable Pressure Sensitive adhesive with Polyester Film) with various pre-mask compositions, as tested against polyurethane test surfaces, which mimic the adherence of the pre-mask to the repair film as contemplated herein.

TABLE 1

Adhesion values of pre-mask to exemplary repair film

| Composition (adhesive and pre-mask) | Exemplary Repair Film Test Surface | Adhesion to Test Surface (g/cm) |
|---|---|---|
| SMI_PM1-Adhesive with Paper Film | SMI_RF1-Polyurethane Film | Paper torn during removal |
| SMI_PM2-Removable Pressure Sensitive adhesive with Polyester Film | SMI_RF1-Polyurethane Film | 51.3 |
| SMI_PM3-Removable Pressure Sensitive adhesive with Polyester Film | SMI_RF1-Polyurethane Film | 25.3 |
| SMI_PM3-Removable Pressure Sensitive adhesive with Polyester Film | SMI_RF2-Polyurethane Film | 12.6 |
| SMI_PM4-Microsphere adhesive with Polypropylene Film | SMI_RF1-Polyurethane Film | 42.2 |

TABLE 1-continued

Adhesion values of pre-mask to exemplary repair film

| Composition (adhesive and pre-mask) | Exemplary Repair Film Test Surface | Adhesion to Test Surface (g/cm) |
|---|---|---|
| SMI_PM4-Microsphere adhesive with Polypropylene Film | SMI_RF2-Polyurethane Film | 80.0 |
| SMI_PM5-Removable Pressure Sensitive adhesive with Polyester Film | SMI_RF1-Polyurethane Film | 11.9 |
| SMI_PM6-Removable Pressure Sensitive adhesive with Polyester Film | SMI_RF1-Polyurethane Film | 42.2 |
| SMI_PM7-Microsphere adhesive with Kraft Paper release liner | SMI_RF2-Polyurethane Film | 28.1 |
| SMI_PM8-Microsphere adhesive with Polypropylene film and kraft paper release liner | SMI_RF2-Polyurethane Film | 33.0 |
| SMI_PM8-Microsphere adhesive with Polypropylene film and kraft paper release liner | SMI_RF3-Polyurethane Film | 96.4 |
| SMI_PM9-Removable adhesive with Kraft Paper Liner | SMI_RF3-Polyurethane Film | 20.1 |
| SMI_PM9-Removable adhesive with Kraft Paper Liner | SMI_RF3-Polyurethane Film | 76.3 |
| SMI_PM11-Removable adhesive with Kraft Paper Liner | SMI_RF3-Polyurethane Film | 88.4 |

The pre-mask can provide rigidity to the repair patch, so that after the release liner is removed from the repair device, the repair device will not fold back onto itself. However the pre-mask is preferably not be too rigid such that when the user is removing the pre-mask after application of the repair patch, the user can peel the pre-mask at a 90° to 180° angle; otherwise the removal of the pre-mask may result in the lifting of the repair patch from the surface to which it is applied to, potentially creating bubbles or wrinkles. Table 2 shows the ability to remove various pre-masks at a 180° angle.

TABLE 2

Removal of select compositions of pre-mask at 180° angles.

| Pre-Mask Tested | Rigidity + 180 Degree Removal |
|---|---|
| SMI_PM5-Removable Pressure Sensitive adhesive with Polyester Film | Yes |
| SMI_PM12-Removable adhesive with Kraft Paper Liner | No |
| SMI_PM6-Removable Pressure Sensitive adhesive with Polyester Film | No |
| SMI_PM2-Removable Pressure Sensitive adhesive with Polyester Film | Yes |
| SMI_PM3-Removable Pressure Sensitive adhesive with Polyester Film | Yes |
| SMI_PM8-Microsphere adhesive with Polypropylene film and kraft paper release liner | Yes |
| SMI_PM7-Microsphere adhesive with Kraft Paper release liner | Yes |
| SMI_PM9-Removable adhesive with Kraft Paper Liner | No |
| SMI_PM10-Removable adhesive with Kraft Paper Liner | No |
| SMI_PM11-Removable adhesive with Kraft Paper Liner | Yes |

The pre-mask is preferably larger in size than the repair patch, creating an area free of repair patch for the user to grasp during application, which allows for release liner removal and application of the remaining assembled device elements without coming into contact with the permanent adhesive layer of the repair patch. Such areas may be referred to as "release tabs". Release tabs protruding beyond the repair patch may, for example, contain on their bottom side either a removable adhesive free area, or protective liners 102 as shown in FIG. 1; so as to allow a user to apply the repair patch without touching any removable adhesive. The release tabs may provide a start point for the user to grip the pre-mask for removal from the repair patch after the repair patch is applied. In one embodiment the pre-mask surface opposite the removable adhesive is capable of receiving and retaining ink such as, for example, the printing of application instructions and/or other labeling information.

Table 3 shows the results of testing various pre-mask adhesive/film combinations.

between the permanent adhesive and the surface. For instance, the adhesion value between the permanent adhesive and the repair patch is preferably be higher than about 800 g/cm 7 days after application, more preferably higher than about 1000 g/cm. Lower adhesion values raise the risk that the repair patch may de-bond during use leaving behind adhesive residue on the surface. Such adhesive residue may be difficult to remove through standard cleaning protocols and create an environment that could attract pathogens and encourage microbial growth.

The present permanent adhesive preferably has an adhesion value of two or more times that of the removable adhesive. For example, three or more, four or more, five or more, six or more, seven or more, eight or more, nine or more, ten or more times.

TABLE 3

Summary of pre-mask characteristics

| Pre-Mask Tested | PU, PP or PET | Latex Free | Differential Release | Rigidity + 180 Degree Removal | Application with or without gloves | Printable |
|---|---|---|---|---|---|---|
| SMI_PM1-Adhesive with Paper Film | No | Yes | No | No | No | Yes |
| SMI_PM12-Removable adhesive with Kraft Paper Liner | No | No | No | No | Yes | Yes |
| SMI_PM5-Removable Pressure Sensitive adhesive with Polyester Film | Yes | Yes | No | Yes | Yes | Yes |
| SMI_PM6-Removable Pressure Sensitive adhesive with Polyester Film | Yes | Yes | Yes | No | Yes | Yes |
| SMI_PM2-Removable Pressure Sensitive adhesive with Polyester Film | Yes | Yes | Yes | n/a | Yes | Yes |
| SMI_PM3-Removable Pressure Sensitive adhesive with Polyester Film | Yes | Yes | No | Yes | Yes | Yes |
| SMI_PM4-Microsphere adhesive with Polypropylene Film | Yes | Yes | Yes | Yes | Yes | Yes |
| SMI_PM8-Microsphere adhesive with Polypropylene film and kraft paper release liner | No | Yes | Yes | No | Yes | Yes |
| SMI_PM9-Removable adhesive with Kraft Paper Liner | Yes | Yes | No | No | Yes | Yes |
| SMI_PM10-Removable adhesive with Kraft Paper Liner | Yes | Yes | No | No | Yes | Yes |
| SMI_PM11-Removable adhesive with Kraft Paper Liner | Yes | Yes | No | Yes | Yes | Yes |

The adhesive selected for the repair patch will generally be a permanent adhesive, due to its intended application for long-term repair of surfaces in a healthcare environment. A removable adhesive typically has an adhesion value of 200 g/cm or less. The adhesive of the present repair patch will preferably have an adhesion value of about 200 g/cm or greater. adhesion value of 200 g/cm or greater such as, for example, about 300 g/cm or greater, about 400 g/cm or greater, about 500 g/cm or greater, about 600 g/cm or greater, about 700 g/cm or greater, about 800 g/cm or greater, about 900 g/cm or greater, about 1000 g/cm or greater. Adhesion value may be measured by ASTMD3330 or PSTC-101. The permanent adhesive will preferably have a bond to the repair patch that is higher than the bond Any suitable permanent adhesive may be used herein. For example, pressure-sensitive adhesives (PSA), permanent adhesives, adhesives that cure with time, light-activated adhesives that cure with electromagnetic energy such as UV or visible light, or heat-activated adhesives may be used. The adhesive may be non-cytotoxic, hypoallergenic, resistant to bacterial growth, or a combination thereof. The adhesive may be in the form of an adhesive layer. A pressure-sensitive adhesive may comprise polyurethane, silicone polymer, acrylic, or other synthetic polymer based adhesive, and may or may not be cross-linked. Adhesives are available commercially from, for example, Adchem Inc. (New York, USA), 3M Canada Inc. (Ontario, Canada). Flexcon Inc. (Massachusetts, USA), and Medical Adhesive Tape Technologies Inc. (New York, USA).

In a preferred embodiment, the permanent adhesive which forms a bond between the repair patch and a surface as contemplated herein, has an adhesion value to the target surface that is at least about 800 g/cm on a polyurethane mattress cover 7 days after application, at the environmental condition of 16° C. to 21° C. and 35-85% relative humidity. Polyurethane was chosen to represent an exemplary surface in need of repair in the healthcare environment, as it is a common material forming mattress coverings in healthcare. Adhesion strengths below this value, when subjected to the forces arising from normal mattress usage, can lead to premature peeling and lifting of the repair patch from the mattress, compromising its ability to maintain an intact surface for cleaning and disinfection. This is important for the application of the repair patch in a healthcare environmental as there is a low tolerance for any peeling or lifting of the repair patch as a result of patient movement, or cleaning by cleaning staff in a healthcare environment. In addition, the present permanent adhesive should show sufficient differential from the pre-mask adhesive to allow the repair patch to be applied and the pre-mask to be removed without causing lifting or shifting of the repair patch from the surface.

The permanent adhesive will preferably not contain chemical agents or material that is toxic to human cells. Further, the permanent adhesive will preferably not elicit an allergic response in humans or animals in close contact with the repair patch and its associated adhesive. The permanent adhesive will preferably not promote microbial growth. The permanent adhesives will preferably be resistant to existing hospital cleaning solutions such as, but not limited to, Hydrogen Peroxide, Isopropanol, Quaternary Ammonium compounds, and Sodium Hypochlorite.

In a preferred embodiment the permanent adhesive is a Pressure Sensitive Adhesive as quick application of the repair patch is desirable, such as for example during routine or terminal (between patients) cleaning. Therefore it is preferable to enable the application of the repair patch without use of, or aid of, tools such as a heat gun. A summary of the desired properties against selected adhesive compositions is presented in Table 4.

TABLE 4

Summary of properties of select adhesives

| Adhesive Tested | Criteria | | | | | |
| --- | --- | --- | --- | --- | --- | --- |
| | Non-Cytotoxic | Hypoallergenic | No Microbial Growth | Chemical Resistance | Adhesive Force | PSA |
| SMI_AD1-Acrylic Pressure Sensitive Adhesive | No | No | Yes | Yes | Yes | Yes |
| SMI_AD2-Acrylic Pressure Sensitive Adhesive | No | No | No | No | No | Yes |
| SMI_AD3-Acrylic Pressure Sensitive Adhesive | No | No | No | No | No | Yes |
| SMI_AD4-Acrylic Pressure Sensitive Adhesive | Yes | Yes | Yes | Yes | Yes | Yes |
| SMI_AD5-Acrylic Pressure Sensitive Adhesive | Yes | Yes | Yes | Yes | Yes | Yes |
| SMI_AD6-Pressure Sensitive Adhesive | Yes* | Yes* | Yes* | No | n/a | No |
| SMI_AD7-Pressure Sensitive Adhesive | Yes* | Yes* | Yes* | No | n/a | No |
| SMI_8Pressure Sensitive Adhesive | Yes* | Yes* | Yes* | No | n/a | No |

*based on technical data from manufacturer

The repair patch forming part of the repair device of the present disclosure may be of a thickness and shape appropriate for the intended purpose of the application in the healthcare environment. The repair patch preferably does not promote microbial growth and demonstrates a microbial growth rate of less than 10% based on test standard ASTM G21-96. The repair patch is preferably resistant to UV radiation effects on the structural integrity of the repair patch, which could compromise its ability to maintain an intact surface following its application.

The present repair patch is preferably resistant to standard cleaning solvents used in healthcare environment so it can be cleaned and disinfected to the same degree as the mattress surface. Such cleaning chemicals may include, but are not limited to, hydrogen peroxide, sodium hypochlorite, isopropanol, and quaternary ammonium based cleaning solutions. A hospital mattress may be cleaned several times a day for disinfection, therefore a repair patch that can withstand the daily hospital cleaning routines and remain fully intact to the mattress over time is advantageous. Peeling or lifting of the repair patch can create an area that is difficult to fully clean and disinfect using standard mattress cleaning protocols, therefore creating a potential harbor for pathogens. It is contemplated that the present repair patch may contain a bio-additive or anti-microbial capable of inhibiting the growth of pathogens at the area of repair patch application, creating a further barrier to pathogen migration from inside the mattress onto the surface through the damaged area. The edge of the present repair patch preferably has a total thickness of 0.254 millimeters or less. Such thickness reduces the risk of the repair patch lifting or peeling from routine cleaning.

Table 5 shows a summary of select repair films tested for use herein. 30 different prototypes were developed and tested based on combinations of 15 films and 10 adhesives, as otherwise described herein.

TABLE 5

Summary of repair film compositions and their characteristics

| Film Tested | Criteria | | | | | | | |
|---|---|---|---|---|---|---|---|---|
| | Poly-urethane | High Surface Energy | Bio-Additive | Non-Cytotoxic | Hypo-allergenic | No Microbial Growth | Chemical resistance | UV Resistance |
| SMI_RF1-Polyurethane Film | Yes | Yes | Yes | Yes | Yes | Yes | Yes | Yes |
| SMI_RF2-Polyurethane Film | Yes | Yes | Yes | Yes | Yes | Yes | Yes | Yes |
| SMI_RF3-Polyurethane Film | Yes | Yes | Yes | Yes | Yes | Yes | Yes | Yes |
| SMI_RF4-Polyurethane Film | Yes | No | No | Yes | Yes | Yes | Yes | Yes |
| SMI_RF5-Polyurethane Film | Yes | No | No | Yes | Yes | Yes | Yes | Yes |
| SMI_RF6-Polyurethane Film | Yes | No | No | Yes | Yes | Yes | Yes | Yes |
| SMI_RF7-Polyester Film | No | No | No | No | No | No | Yes | Yes |
| SMI_RF8-Polyurethane Film | Yes | No | No | Yes | Yes | Yes | Yes | Yes |
| SMI_RF9-Polyurethane Film | Yes | No | No | No | No | No | Yes | Yes |
| SMI_RF10-Polyvinyl Film | No | No | No | No | No | No | Yes | Yes |
| SMI_RF11-Polyvinyl Film | No | No | No | No | No | No | Yes | Yes |

The present repair patch may be made any suitable substance or combination of substances. For example, the repair patch may comprise (or consist of) a film layer. The repair patch may comprise a thermoplastic or thermosetting polymer or a combination of polymers. Examples of thermoplastic polymers include, but are not limited to, polyacetals, polyolefins, polyacrylics, polycarbonates, polystyrenes, polyesters, polyamides, polyvinyl, polysulfonates, polysulfides, polythioesters, polysulfones, polysulfonamides, polyureas, polyurethane, or the like, and combinations thereof. The present repair patch may comprise a polyethylene, polyurethane, polypropylene, nylon, silicone, polyamide, polyester, polyvinyl, or the like, or combinations thereof. Preferably the repair patch comprises a film of polyvinyl, polyurethane, or the like. Such films are available commercially from a variety of sources, such as, for example Dartex Coatings Inc. (Nottingham, UK), Derma-Med Coatings Company LLC. (Ohio, USA), Argotec Inc. (Massachusetts, USA), Flexcon Inc. (Massachusetts, USA), ETC Technologies Inc. (Massachusetts, USA), and Medical Adhesive Tape Technologies Inc. (New York, USA).

The present pre-mask may be made any suitable substance or combination of substances. For example, the pre-mask may comprise a suitable film substrate such as paper, polyester, polypropylene, or the like.

Figure 2:
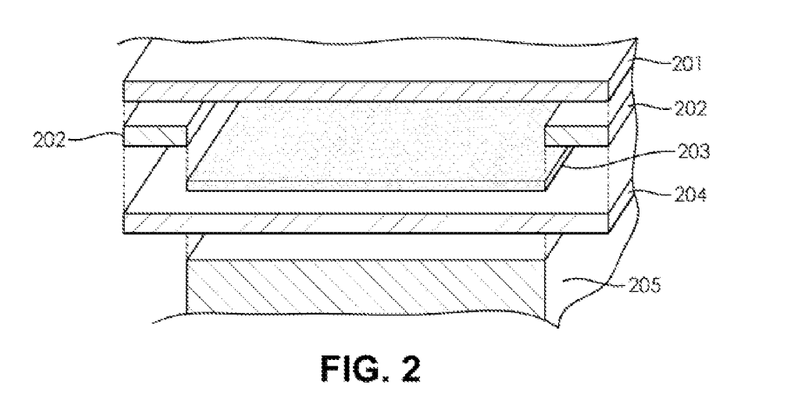
FIG. 2 shows a three quarters perspective of an exploded cross-sectional view of an embodiment of the present repair device.

FIG. 2 shows an exemplary exploded representation of the assembled repair device of the present disclosure, comprising an upper pre-mask 201 with removable adhesive (not shown) adjacent to repair patch 203 which is in turn bracketed by release tabs 202, and a further release liner 204 on the side of the repair patch 203 opposing the pre-mask 201. On the side of repair patch 203, opposing pre-mask 201, is a layer of permanent adhesive (not shown) interposed between the release liner 204 and repair film (not shown), as further described herein. Also pictured in FIG. 2 is a surface in need of repair 205.

Figure 3:
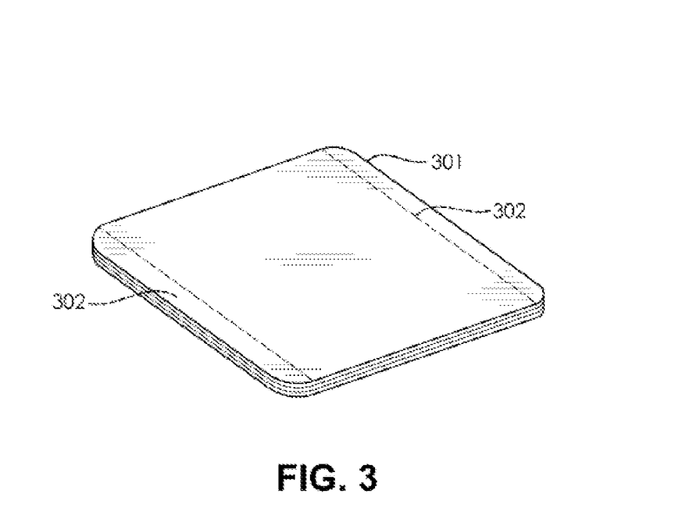
FIG. 3 shows a three quarters perspective of the assembled repair device of an embodiment of the present repair device.

FIG. 3 shows the assembled repair device 301, with dotted lines 302 representing the area of the repair patch (as represented in 103 and 203), of smaller size than the topmost pre-mask (as represented in 101 and 201) and bottom release liner (as represented in 104 and 204). As described herein, the area of pre-mask not covered by repair patch may be covered by release liner, or in the alternative may be free of adhesive, so as to increase ease of application by a user.

Figure 4A:
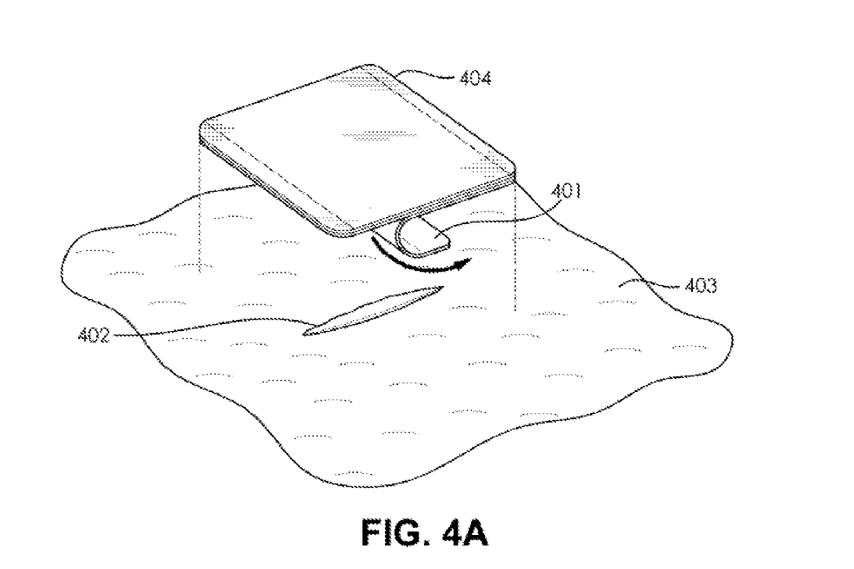
FIG. 4A-4C show the process of application of the repair patch to repair a tear in a surface using an embodiment of the present repair device.
Figure 4B:
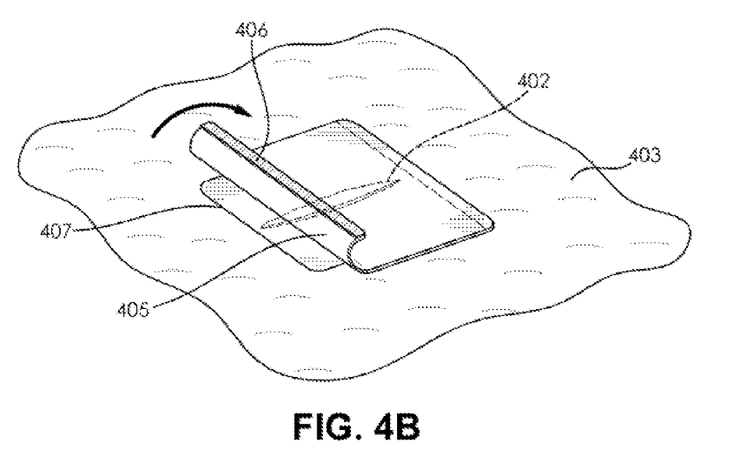
Figure 4C:
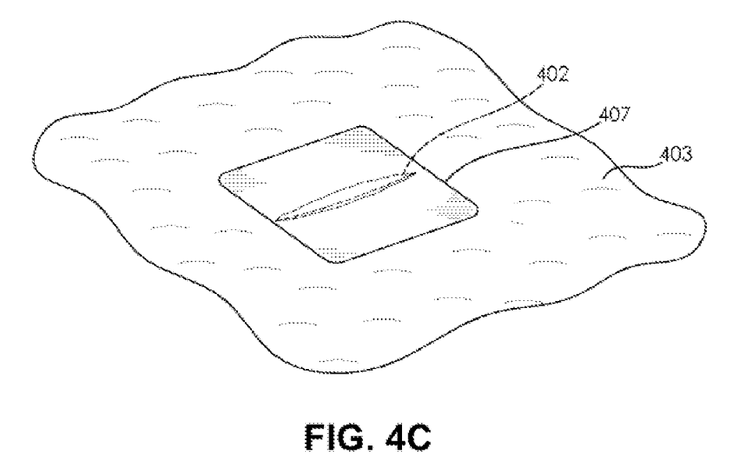

FIG. 4a illustrates one exemplary application of assembled repair device 404 on to a surface 403 which contains a tear 402. Release liner 401 is removed from the assembled repair device 404, exposing the permanent adhesive side of the repair patch. FIG. 4b shows the placement of the repair patch following removal of release liner 401 (FIG. 4a) on tear 402 present on surface 403. Pre-mask 405 is removed from repair patch 407, with the release tab 406 used to maintain a grip of pre-mask 405 without the user coming into contact with the removable adhesive holding the pre-mask 405 to repair patch 407. FIG. 4c shows the repair patch 407 remaining over tear 402, thereby restoring integrity to surface 403.

It is contemplated that the different parts of the present description may be combined in any suitable manner. For instance, the present examples, methods, aspects, embodiments or the like may be suitably implemented or combined with any other embodiment, method, example or aspect of the invention.

Unless defined otherwise, all technical and scientific terms used herein have the same meaning as is commonly understood by one of ordinary skill in the art to which this invention belongs. Unless otherwise specified, all patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference. Citation of references herein is not to be construed nor considered as an admission that such references are prior art to the present invention.

Use of examples in the specification, including examples of terms, is for illustrative purposes only and is not intended to limit the scope and meaning of the embodiments of the invention herein. Numeric ranges are inclusive of the numbers defining the range. In the specification, the word "comprising" is used as an open-ended term, substantially equivalent to the phrase "including, but not limited to," and the word "comprises" has a corresponding meaning.

The invention includes all embodiments, modifications and variations substantially as hereinbefore described and with reference to the examples and figures. It will be apparent to persons skilled in the art that a number of variations and modifications can be made without departing from the scope of the invention as defined in the claims. Examples of such modifications include the substitution of known equivalents for any aspect of the invention in order to achieve the same result in substantially the same way.

What is claimed is:

1. A repair device for repairing a damaged surface of a health care device, the repair device comprising a repair patch, a pre-mask layer, and a release liner;
   wherein the repair patch is smaller in area than the pre-mask layer and is interposed between the pre-mask layer and the release liner;
   wherein the repair patch comprises a microbial growth rate of less than 10% based on test standard ASTM G21-96;
   the repair device further comprising
   a removable adhesive interposed between the pre-mask layer and the repair patch, wherein the removable adhesive is non-cytotoxic and hypoallergenic; and
   a permanent adhesive interposed between the repair patch and the release liner, wherein the permanent adhesive is non-cytotoxic and hypoallergenic;
   wherein the pre-mask layer comprises a pair of non-adhesive portions extending along entireties of a pair of opposing ends of the pre-mask layer, each non-adhesive portion being located in an overhanging area of the pre-mask layer that is not in contact with the repair patch so as to allow a user to apply the repair patch without touching the removable adhesive,
   wherein the adhesion value between the removable adhesive and the repair patch is lower than the adhesion value between the permanent adhesive and the damaged surface of the health care device to which the repair patch can be applied, and
   wherein the adhesion value between the removable adhesive and the repair patch is between 28 g/cm and 200 g/cm per ASTM D3330 testing standards.

2. The repair device of claim 1, wherein the adhesion value between the permanent adhesive and the damaged surface is at least three times that of the adhesion value between the removable adhesive and the repair patch.

3. The repair device of claim 1, wherein the adhesion value between the permanent adhesive and the damaged surface is at least eight times that of the adhesion value between the removable adhesive and the repair patch.

4. The repair device of claim 1, wherein the adhesion value between the removable adhesive and the repair patch is about 200 g/cm or less.

5. The repair device of claim 1, wherein the adhesion value between the removable adhesive and the repair patch is about 100 g/cm or less.

6. The repair device of claim 1, wherein the adhesion value between the permanent adhesive and the damaged surface is about 600 g/cm or greater.

7. The repair device of claim 1, wherein the adhesion value between the permanent adhesive and the damaged surface is about 800 g/cm or greater.

8. The repair device of claim 1, wherein the permanent adhesive is a pressure-sensitive adhesive.

9. The repair device of claim 1, wherein the repair patch comprises a film of polyvinyl, polyurethane, or a combination thereof.

10. The repair device of claim 1, wherein the pre-mask layer comprises one of a polyester, a polypropylene, and a paper material with sufficient rigidity to prevent the repair patch from folding back.

11. The repair device of claim 1, wherein the removable adhesive comprises an ultra-removable microsphere adhesive.

12. The repair device of claim 1, wherein the pre-mask layer comprises a polyester film.

13. The repair device of claim 1, wherein the removable adhesive comprises an ultra-removable microsphere adhesive and the pre-mask layer comprises a polyester film.

14. A health care device comprising the repair device according to claim 1.

15. A mattress comprising the repair device according to claim 1.

16. A method of applying a repair patch to a damaged surface of a health care device, said method comprising:
   providing the repair device according to claim 1;
   removing the release liner;
   applying the repair patch to the damaged surface of the health care device; and
   removing the pre-mask layer from the repair patch using the non-adhesive portions.

17. The method of claim 16, wherein the healthcare device is a mattress.

* * * * *